Patented Nov. 28, 1944

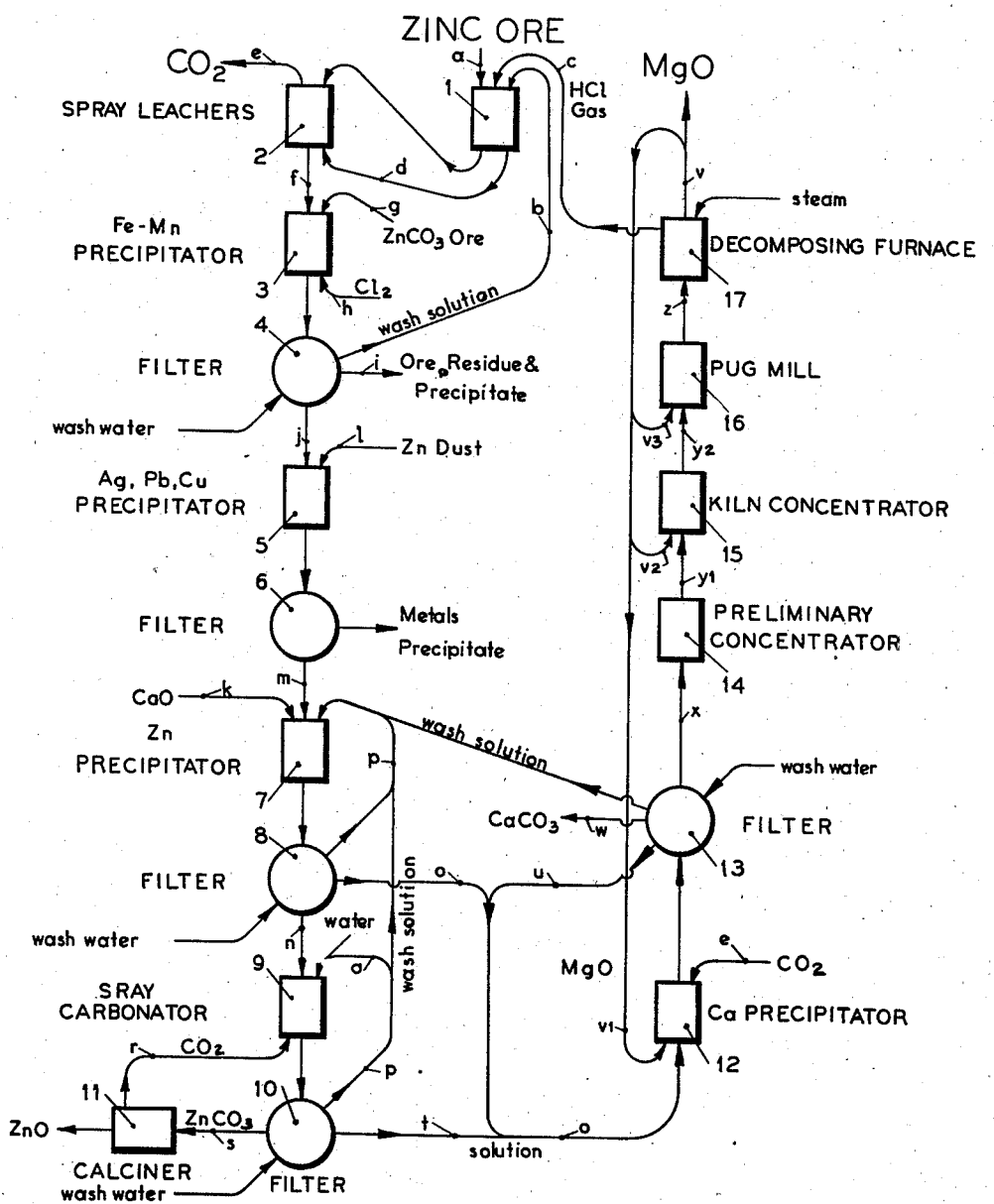

2,363,572

UNITED STATES PATENT OFFICE 2,363,572

TREATMENT OF ZINC CARBONATE ORES

Niels C. Christensen, Salt Lake City, Utah

Application January 17, 1944, Serial No. 518,619

13 Claims. (Cl. 23—61)

This invention relates to the treatment of zinc carbonate ores which contain relatively large amounts of calcium and magnesium carbonate and are therefore not suited to treatment by acid leaching processes in which the acid consumed in the process is not recovered. The process aims to recover the zinc as a high grade product from such ores and also to recover other metals such as Au, Ag, Cu and Pb, and also to recover the Ca and Mg in high grade products, and the $CO_2$ as a concentrated gas, and at the same time to regenerate and recover the acid consumed in leaching the ore so that it may be reused in the treatment of more ore.

The process consists in general of five main parts or steps as outlined below:

I. Leaching the ore with an HCl solution to dissolve the soluble minerals as chlorides and drive off the $CO_2$ and precipitating impurities from the solution so as to recover a pure $ZnCl_2$—$CaCl_2$—$MgCl_2$ solution.

II. Precipitating the zinc from the

with lime as a zinc hydroxychloride mixed with $Mg(OH)_2$; separating the mixed precipitates and treating with $CO_2$ in an aqueous pulp to convert the Zn to $ZnCO_3$ and the Mg to $MgCl_2$ in solution; separating the $ZnCO_3$ from the $MgCl_2$ solution and calcining it to form ZnO and $CO_2$ and using the $CO_2$ again in the carbonating operation.

III. Precipitating the Ca from the solution as $CaCO_3$ by mixing MgO (recovered in the process) with the solution and treating with $CO_2$ recovered from the leaching operation.

IV. Concentrating the $MgCl_2$ solution to form a hot very concentrated $MgCl_2$ solution and mixing MgO (recovered in the process) with this solution to form a solid $MgCl_2$—MgO product.

V. Drying the $MgCl_2$—MgO product and heating this product with steam and air (oxygen) to decompose the $MgCl_2$ and make MgO and HCl and using the HCl again in the leaching operation.

The complete process is illustrated in the accompanying flow sheet and the methods of carrying out each step are set forth in the following description:

I. Leaching the ore with HCl solution

The finely crushed ore (a) mixed with wash solution (b) is treated with HCl gases (c) from the decomposing furnace 17 in the spray leachers 1 and 2, the mixture of ore and solution being first passed through the spray leacher 1 concurrent with the HCl gas (c) and thereafter through spray leacher 2 in countercurrent to the exit gases (d) from the spray leacher 1. By the concurrent treatment followed by the countercurrent treatment described, the soluble carbonates in the ore are dissolved by direct treatment with the HCl gases without forming a strongly acid solution and, at the same time, with maximum efficiency in utilization of the HCl gases. In this leaching process the soluble carbonates are dissolved and the $CO_2$ (e) is driven off as indicated in the following chemical equations:

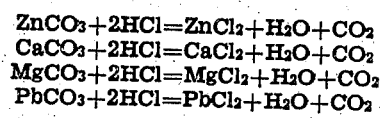

forming a relatively concentrated chloride solution.

(Though the method of leaching described above is preferred, the ore may be leached in any suitable agitator by treatment with an HCl solution made by condensing the HCl gases from the decomposing furnace 17. It should also be noted that the grinding of the ore may be either dry or wet, and in the latter case the grinding may be carried out in the wash solution (b) to avoid addition of excess water in the process.)

The mixture of chloride solution and ore residue (f) is treated with $ZnCO_3$ ore (g) to neutralize the acid and precipitate the iron from solution in the agitator 3 (called Fe-Mn precipitator on the flow sheet) and, if the ore contains manganese which is dissolved in the leaching operation, the Mn is also precipitated in this operation by adding chlorine (h) to the solution along with the $ZnCO_3$ (or by the addition of bleaching powder) as indicated in the following equations:

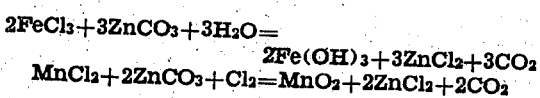

The ore residue and precipitates (i) are separated from the purified solution (j) and washed with water on the filter 4, the wash solution (b) being used in the leaching operation as previously described. If the Fe-Mn-free solution (j) contains any valuable metals in solution, such as Ag, Pb, Cd, Cu, etc. these are precipitated by treatment with zinc dust (l) in the agitator 5 (indicated as Ag, Pb, Cu, precipitator on the flow sheet) and the precipitated metals are separated from the purified solution on the filter 6.

II. Zinc precipitation and recovery

The purified $ZnCl_2$—$CaCl_2$—$MgCl_2$ solution ($m$) from the filter 6, diluted with wash solutions from subsequent filtering operations is treated with a chemical equivalent of lime ($k$) to zinc in solution to precipitate the zinc as a hydroxychloride mixed with magnesium hydroxide as indicated in the following chemical equations:

$$4ZnC_2 + 3Ca(OH)_2 = 2Zn_2(OH)_3Cl + 3CaCl_2$$
$$MgCl_2 + Ca(OH)_2 = Mg(OH)_2 + CaCl_2$$

The precipitation is carried out in a pebble mill containing small flint pebbles or porcelain marbles, indicated as Zn precipitator 7 on the flow sheet, in order to avoid formation of lumps and secure complete utilization of the lime. The mixed precipitates ($n$) are separated from the $CaCl_2$—$MgCl_2$ solution ($o$) and washed with water on the filter 8, the wash solution ($p$) being used to dilute the solution ($m$) from the filter 6. The mixed precipitates ($n$) mixed with water and wash solution ($q$) from the subsequent filtering operation are treated in countercurrent with $CO_2$ ($r$) from the calciner 11 in the spray carbonator 9 to convert the zinc to zinc carbonate and remove the magnesium as $MgCl_2$ in solution as indicated in the following chemical equation:

$$2Zn_2(OH)_3Cl + Mg(OH)_2 + 4CO_2 = 4ZnCO_3 + MgCl_2 + 4H_2O$$

The zinc carbonate ($s$) is separated from the dilute $MgCl_2$ solution ($t$) and washed on the filter 10, the $MgCl_2$ solution being mixed with the $CaCl_2$—$MgCl_2$ solution ($o$) from the filter 8 and the wash solution ($p$) being used to dilute the solution ($m$) previous to the zinc precipitation. The zinc carbonate ($s$) may be dried and marketed as such or may be dried and calcined in the calciner 11 to form $ZnO$ and recover the $CO_2$ as indicated in the following equation:

$$ZnCO_3 = ZnO + CO_2$$

the $CO_2$ ($r$) being used to carbonate the mixed precipitates ($n$) as previously described. If the zinc is recovered as carbonate the carbonation is carried out with $CO_2$ ($e$) from the leaching operation.

III. Precipitation of Ca as $CaCO_3$

The $CaCl_2$—$MgCl_2$ solution ($o$) from the zinc precipitation, mixed with the $MgCl_2$ solution ($t$) from the carbonation step and with wash solution ($u$) from the filter 13 is mixed with finely ground $MgO$ ($v1$) from the decomposing furnace 17 and treated in countercurrent with $CO_2$ ($e$) from the leaching operation in the spray carbonator 12 (called Ca precipitator on the flow sheet) to precipitate the calcium as $CaCO_3$ as indicated in the following chemical equation:

$$CaCl_2 + MgO + CO_2 = CaCO_3 + MgCl_2$$

The precipitated $CaCO_3$ ($w$) is separated from the $MgCl_2$ solution ($x$) and washed with water on the filter 13 the wash solution ($u$) being used to dilute the $CaCl_2$—$MgCl_2$ solution ($o$) from the zinc precipitation as previously mentioned.

IV. Recovery of a solid $MgCl_2$—$MgO$ product

The $MgCl_2$ solution ($x$) is evaporated in the preliminary concentrator 14, preferably a multiple effect evaporator, to secure a relatively concentrated solution ($y1$) which is further concentrated to form a hot very concentrated $MgCl_2$ solution ($y2$) in the kiln concentrator 15. To prevent excessive decomposition of the $MgCl_2$ in the kiln concentrator 15 a small amount of $MgO$ ($v2$) from the decomposing furnace 17 is mixed with the partially concentrated $MgCl_2$ solution ($y1$). The hot concentrated syrupy $MgCl_2$ solution ($y2$) from the kiln concentrator 15 is mixed with sufficient $MgO$ ($v3$) from the decomposing furnace 17 to form a solid $MgCl_2$—$MgO$ product for treatment in the subsequent decomposing operation. (To avoid loss of HCl in the concentrating operation the waste gases from the kiln concentrator may be sent to the sprayer leacher 2 or to a special scavenging spray for treatment with the $ZnCO_3$ ore for recovery of the HCl carried in these gases.)

V. Decomposition of the $MgCl_2$

The $MgCl_2$—$MgO$ product from the pug mill 16 is crushed to approximately six or eight mesh and treated in countercurrent with superheated steam in the muffle type decomposing furnace 17 to decompose the $MgCl_2$ and form $MgO$ and HCl as indicated in the following chemical equation:

$$MgCl_2 + H_2O = MgO + 2HCl$$

the HCl gases ($c$) being used in the leaching of the zinc carbonate ore as previously described. The decomposition of the MgCl by the steam is very rapid and complete at 600° C.—650° C. and may be carried out with a relatively small excess of steam by passing the $MgCl_2$ product through the furnace in countercurrent to the steam. A treatment period of 30–45 minutes by this method is sufficient to secure substantially complete decomposition of the $MgCl_2$ giving a $MgO$ product containing only one to two tenths per cent chlorine. The operation may be carried out in any suitable type of muffle furnace, such as a multiple hearth, straight line or tower type.

From the foregoing description it will be seen, that the process makes possible the treatment of oxidized zinc ores containing relatively large amounts of $CaCO_3$ and $MgCO_3$, due to the fact that the process recovers the HCl used in the leaching operation for reuse in the process, and that the process not only recovers the zinc in a high grade product and (other valuable metals) but, also recovers the calcium and magnesium in high grade products and the $CO_2$ not used in the manufacture of products in the process in a pure highly concentrated form.

What is claimed is:

1. The process of treating zinc carbonate ores containing alkali earth carbonate minerals and magnesium carbonate, which consists in treating said ores with a hydrochloric acid solution to dissolve the zinc carbonate and other soluble carbonates, separating the chloride solution thus formed from the treated ore residue, treating said chloride solution with lime and thereby precipitating the zinc as a hydroxychloride together with magnesium hydroxide, separating said mixed precipitates from the solution, treating said mixed precipitates in an aqueous pulp with $CO_2$ and thereby converting the zinc to zinc carbonate and forming $MgCl_2$ in solution, separating the zinc carbonate from the $MgCl_2$ solution thus formed, treating the solution separated from the mixed zinc hydroxychloride-magnesium hydroxide precipitate with $MgO$ and $CO_2$ and thereby precipitating the calcium therefrom as $CaCO_3$, separating the $CaCO_3$ from the $MgCl_2$ solution thus formed, evaporating said $MgCl_2$ solution to form a very concentrated $MgCl_2$ solution, mixing $MgO$ with said last concentrated solution to form a solid $MgCl_2$—$MgO$ product, treating said $MgCl_2$—$MgO$ product with steam to decompose the $MgCl_2$ and form MgO and HCl, and using said HCl for treating more zinc ore.

2. The process of treating zinc carbonate ores containing alkali earth carbonate minerals and magnesium carbonate, which consists in leaching said ores with a hydrochloric acid solution to dissolve the zinc carbonate and other soluble carbonates, separating the chloride solution thus formed from the leached ore residue, treating said chloride solution with lime and thereby precipitating the zinc as a hydroxychloride together with magnesium hydroxide, separating said mixed precipitates from the solution, treating said mixed precipitates in an aqueous pulp with $CO_2$ and thereby converting the zinc to zinc carbonate and forming $MgCl_2$ in solution, separating the zinc carbonate from the $MgCl_2$ solution thus formed, treating the solution separated from the mixed zinc hydrochloride-magnesium hydroxide precipitate with MgO and $CO_2$ and thereby precipitating the calcium therefrom as $CaCO_3$, separating the $CaCO_3$ from the $MgCl_2$ solution thus formed, evaporating said $MgCl_2$ solution to form a very concentrated $MgCl_2$ solution, mixing MgO with said last concentrated solution to form a solid $MgCl_2$—MgO product, treating said $MgCl_2$—MgO product with steam to decompose the $MgCl_2$ and form MgO and HCl, and using said HCl for leaching more zinc ore and using said MgO for precipitatig calcium from more solution as described, and for making a solid $MgCl_2$—MgO product from more concentrated $MgCl_2$ solution.

3. The process of treating zinc carbonate ores containing alkali earth carbonate minerals which consists, in leaching said ores with a hydrochloric acid solution containing $MgCl_2$ to dissolve the zinc carbonate and other soluble carbonates, separating the chloride solution thus formed from the leached ore residue, treating said chloride solution with lime in amount substantially chemically equivalent to the zinc in said solution and thereby precipitating the zinc as a hydroxychloride together with magnesium hydroxide, separating said mixed precipitates from the solution, treating said mixed precipitates in an aqueous pulp with $CO_2$ and thereby converting the zinc to zinc carbonate and forming $MgCl_2$ in solution, separating the zinc carbonate from the $MgCl_2$ solution thus formed, treating the solution separated from the mixed zinc hydroxychloride magnesium hydroxide precipitate with MgO and $CO_2$ and thereby precipitating the calcium therefrom as $CaCO_3$, separating the $CaCO_3$ from the $MgCl_2$ solution thus formed, evaporating said $MgCl_2$ solution to form a very concentrated $MgCl_2$ solution, mixing MgO with said last concentrated solution to form a solid $MgCl_2$—MgO product, treating said $MgCl_2$—MgO product with steam to decompose the $MgCl_2$ and form MgO and HCl, and using said HCl for leaching more zinc ore and using said MgO for precipitating calcium from more solution as described and for making a solid $MgCl_2$—MgO product from more concentrated $MgCl_2$ solution.

4. The process of treating zinc carbonate ores containing alkali earth carbonate minerals which consists, in treating said ores with a hydrochloric acid solution containing $MgCl_2$ to dissolve the zinc carbonate and other soluble carbonates, separating the chloride solution thus formed from the treated ore residue, treating said chloride solution with lime in amount substantially chemically equivalent to the zinc in said solution and thereby precipitating the zinc as a hydroxychloride together with magnesium hydroxide, separating said mixed precipitates from the solution, treating said mixed precipitates in an aqueous pulp with $CO_2$ and thereby converting the zinc to zinc carbonate and forming $MgCl_2$ in solution, separating the zinc carbonate from the $MgCl_2$ solution thus formed, treating the solution separated from the mixed zinc hydroxychloride magnesium hydroxide precipitate with MgO and $CO_2$ and thereby precipitating the calcium therefrom as $CaCO_3$, separating the $CaCO_3$ from the $MgCl_2$ solution thus formed, evaporating said $MgCl_2$ solution to form a very concentrated $MgCl_2$ solution, mixing MgO with said last concentrated solution to form a solid $MgCl_2$—MgO product, treating said $MgCl_2$—MgO product with steam to decompose the $MgCl_2$ and form MgO and HCl, using said HCl for treating more zinc ore and using said MgO for precipitating calcium from more solution as described and for making a solid $MgCl_2$—MgO product from more concentrated $MgCl_2$ solution as described, and calcining said zinc carbonate to form zinc oxide and $CO_2$ and using said $CO_2$ in the precipitation of more zinc carbonate.

5. The process of treating zinc carbonate ores containing iron and manganese compounds, alkali earth carbonate minerals and magnesium carbonate which consists, in treating said ores with a hydrochloric acid solution to dissolve the zinc carbonate and other soluble carbonates, separating the chloride solution thus formed from the treated ore residue, precipitating the iron and manganese from said solution with zinc carbonate ore, treating the solution with metallic zinc to precipitate metals below zinc in the electromotive series that are present in the solution, treating said purified chloride solution with lime and thereby precipitating the zinc as a hydroxychloride together with magnesium hydroxide, separating said mixed precipitates from the solution, treating said mixed precipitates in an aqueous pulp with $CO_2$ and thereby converting the zinc to zinc carbonate and forming $MgCl_2$ in solution, separating the zinc carbonate from the $MgCl_2$ solution thus formed, treating the solution separated from the mixed zinc hydroxychloride-magnesium hydroxide precipitate with MgO and $CO_2$ thereby precipitating the calcium therefrom as $CaCO_3$, separating the $CaCO_3$ from the $MgCl_2$ solution thus formed, evaporating said $MgCl_2$ solution to form a very concentrated $MgCl_2$ solution, mixing MgO with said last concentrated solution to form a solid $MgCl_2$—MgO product, treating said $MgCl_2$—MgO product with steam to decompose the $MgCl_2$ and form MgO and HCl, and using said HCl for treating more zinc ore.

6. The process of treating zinc carbonate ores containing iron and manganese compounds, alkali earth carbonate minerals and magnesium carbonate which consists, in treating said ores with a hydrochloric acid solution to dissolve the zinc carbonate and other soluble carbonates, separating the chloride solution thus formed from the treated ore residue, precipitating the iron and manganese from said solution with zinc carbonate ore, further treating the solution with metallic zinc to precipitate metals below zinc in the electromotive series that are present in the solution, treating said purified chloride solution with lime and thereby precipitating the zinc as a hydroxychloride together with magnesium hydroxide, separating said mixed precipitates from the solution, treating said mixed precipitates in an aqueous pulp with $CO_2$ thereby converting the zinc to zinc carbonate and forming $MgCl_2$ in solution, separating the zinc carbonate from the $MgCl_2$ solution thus formed, treating the solution separated from the mixed zinc hydroxychloride-magnesium hydroxide precipitate with MgO and $CO_2$ thereby precipitating the calcium therefrom as $CaCO_3$, separating the $CaCO_3$ from the $MgCl_2$ solution thus formed, evaporating said $MgCl_2$ solution to form a very concentrated $MgCl_2$ solution, mixing MgO with said last concentrated solution to form a solid $MgCl_2$—MgO product, treating said $MgCl_2$—MgO product with steam to decompose the $MgCl_2$ and form MgO and HCl, and using said HCl for treating more zinc ore, using said MgO for precipitating calcium from more solution as described and for making a solid $MgCl_2$—MgO product from more concentrated $MgCl_2$ solution.

7. The process of treating zinc carbonate ores containing iron and manganese compounds and alkali earth carbonate minerals which consists, in treating said ores with a hydrochloric acid solution containing $MgCl_2$ to dissolve the zinc carbonate and other soluble carbonates, separating the chloride solution thus formed from the treated ore residue, precipitating the iron and manganese from said solution with zinc carbonate ore, treating the solution with metallic zinc to precipitate metals below zinc in the electromotive series contained in the solution, treating said purified chloride solution with lime in amount substantially chemically equivalent to the zinc in said solution thereby precipitating the zinc as a hydroxychloride together with magnesium hydroxide, separating said mixed precipitates from the solution, treating said mixed precipitates in an aqueous pulp with $CO_2$ thereby converting the zinc to zinc carbonate and forming $MgCl_2$ in solution, separating the zinc carbonate from the $MgCl_2$ solution thus formed, treating the solution separated from the mixed zinc hydroxychloride-magnesium hydroxide precipitate with MgO and $CO_2$ thereby precipitating the calcium therefrom as $CaCO_3$, separating the $CaCO_3$ from the $MgCl_2$ solution thus formed, evaporating said $MgCl_2$ solution to form a very concentrated $MgCl_2$ solution, mixing MgO with said last concentrated solution to form a solid $MgCl_2$—MgO product, treating said $MgCl_2$—MgO product with steam to decompose the $MgCl_2$ and form MgO and HCl, using said HCl for treating more zinc ore, using said MgO for precipitating calcium from more solution as described and for making a solid $MgCl_2$—MgO product from more concentrated $MgCl_2$ solution.

8. The process of treating zinc carbonate ores containing other soluble carbonate minerals which consists, in leaching said ores with a hydrochloric acid solution containing $MgCl_2$ to dissolve the zinc carbonate and the other soluble carbonates, separating the chloride solution thus formed from the leached ore residue, treating said chloride solution with lime in amount substantially chemically equivalent to the zinc in said solution thereby precipitating the zinc as a hydroxychloride together with magnesoium hydroxide, separating said mixed precipitates from the solution, treating said mixed precipitates in an aqueous pulp with $CO_2$ and thereby converting the zinc to zinc carbonate and forming $MgCl_2$ in solution, separating the zinc carbonate from the $MgCl_2$ solution thus formed, treating the solution separated from the mixed zinc hydroxychloride-magnesium hydroxide precipitate with MgO and $CO_2$ and thereby precipitating the calcium therefrom as $CaCO_3$, separating the $CaCO_3$ from the $MgCl_2$ solution thus formed, evaporating said $MgCl_2$ solution to form a very concentrated $MgCl_2$ solution, mixing MgO with said last concentrated solution to form a solid $MgCl_2$—MgO product, treating said $MgCl_2$—MgO product with steam to decompose the $MgCl_2$ and form MgO and HCl, using said HCl for leaching more zinc ore, using said MgO for precipitating calcium from more solution as described and for making a solid $MgCl_2$—MgO product from more concentrated $MgCl_2$ solution as described, calcining said zinc carbonate to form zinc oxide and $CO_2$ and using said $CO_2$ in the precipitation of more zinc carbonate.

9. The process of treating zinc carbonate ores containing other soluble carbonate minerals including magnesium carbonate which consists, in leaching said ores with a hydrochloric acid solution to dissolve the zinc carbonate and other soluble carbonates, separating the chloride solution thus formed from the leached ore residue, treating said chloride solution with lime in amount chemically equivalent to the zinc in said solution thereby precipitating the zinc as a hydroxychloride together with magnesium hydroxide, separating said mixed precipitates from the solution, treating said mixed precipitates in an aqueous pulp with $CO_2$ and thereby converting the zinc to zinc carbonate and forming $MgCl_2$ in solution, separating the zinc carbonate from the $MgCl_2$ solution thus formed, treating the solution separated from the mixed zinc hydroxychloride-magnesium hydroxide precipitate with MgO and $CO_2$ and thereby precipitating the calcium therefrom as $CaCO_3$, separating the $CaCO_3$ from the $MgCl_2$ solution thus formed, evaporating said $MgCl_2$ solution to form a very concentrated $MgCl_2$ solution, mixing MgO with said last concentrated solution to form a solid $MgCl_2$—MgO product, treating said $MgCl_2$—MgO product with steam to decompose the $MgCl_2$ and form MgO and HCl, and using said HCl for leaching more zinc ore.

10. The process of treating zinc carbonate ores containing other soluble carbonate minerals including magnesium carbonate which consists, in leaching said ores with a hydrochloric acid solution to dissolve the zinc carbonate and other soluble carbonates, separating the chloride solution thus formed from the leached ore residue, treating said chloride solution with lime in amount chemically equivalent to the zinc in solution and thereby precipitating the zinc as a hydroxychloride together with magnesium hydroxide, separating said mixed precipitates from the solution, treating said mixed precipitates in an aqueous pulp with $CO_2$ thereby converting the zinc to zinc carbonate and forming $MgCl_2$ in solution, separating the zinc carbonate from the $MgCl_2$ solution thus formed, treating the solution separated from the mixed zinc hydroxychloride-magnesium hydroxide precipitate with MgO and $CO_2$ thereby precipitating the calcium therefrom as $CaCO_3$, separating the $CaCO_3$ from the $MgCl_2$ solution thus formed, evaporating said $MgCl_2$ solution to form a very concentrated $MgCl_2$ solution, mixing MgO with said last concentrated solution to form a solid $MgCl_2$—MgO product, treating said $MgCl_2$—MgO product with steam to decompose the $MgCl_2$ and form MgO and HCl, using said HCl for leaching more zinc ore, using said MgO for precipitating calcium from more solution as described and for making a solid $MgCl_2$—MgO product from more concentrated $MgCl_2$ solution.

11. A cyclic process of treating mixed carbonate ores of zinc and magnesium, comprising the steps of leaching the ores with HCl to produce a solution of chlorides, treating said solution of chlorides with lime to form a precipitate of zinc hydroxychloride mixed with magnesium hydroxide, treating the precipitate with $CO_2$ to form zinc carbonate, mixing the solution remaining from said last treatment with the solution remaining following the lime precipitation step, treating said last mixed solution to precipitate calcium carbonate, separating the calcium carbonate, concentrating the remaining solution, mixing the concentrated solution with MgO, treating the mixture thus formed with steam at a high temperature to produce MgO and HCl, and using the HCl to leach additional quantities of mixed carbonate ores.

12. A process according to claim 11, in which the ore treated also contains calcium carbonate.

13. A process according to claim 11, in which a solution of $MgCl_2$ is added to the leaching solution.

NIELS C. CHRISTENSEN.